United States Patent
Kikukawa et al.

(10) Patent No.: US 7,876,665 B2
(45) Date of Patent: Jan. 25, 2011

(54) OPTICAL RECORDING MEDIUM AND METHOD FOR REPRODUCING INFORMATION FROM OPTICAL RECORDING MEDIUM

(75) Inventors: Takashi Kikukawa, Tokyo (JP); Narutoshi Fukuzawa, Tokyo (JP); Tatsuhiro Kobayashi, Tokyo (JP); Junji Tominaga, Tsukuba (JP); Takashi Nakano, Tsukuba (JP); Takayuki Shima, Tsukuba (JP); Joo-ho Kim, Suwon-si (KR); In-oh Hwang, Suwon-si (KR)

(73) Assignee: TDK Corporation, Tokyo (JP)

( * ) Notice: Subject to any disclaimer, the term of this patent is extended or adjusted under 35 U.S.C. 154(b) by 416 days.

(21) Appl. No.: 11/990,076

(22) PCT Filed: Aug. 8, 2006

(86) PCT No.: PCT/JP2006/315623
§ 371 (c)(1),
(2), (4) Date: Feb. 6, 2008

(87) PCT Pub. No.: WO2007/018195
PCT Pub. Date: Feb. 15, 2007

(65) Prior Publication Data
US 2009/0016205 A1    Jan. 15, 2009

(30) Foreign Application Priority Data
Aug. 8, 2005    (JP) .............................. 2005-230094

(51) Int. Cl.
G11B 7/24    (2006.01)
(52) U.S. Cl. .................................. 369/275.3; 369/288

(58) Field of Classification Search .............. 369/275.1, 369/275.3, 274.4, 13.46, 13.51, 47.53, 59.11, 369/288; 428/64.4
See application file for complete search history.

(56) References Cited

U.S. PATENT DOCUMENTS 6,580,678 B2 *    6/2003    Kondo et al. .............. 369/275.2

(Continued)

FOREIGN PATENT DOCUMENTS

EP    1 555 666 A1    7/2005

(Continued)

OTHER PUBLICATIONS

Kikukawa et al., "Rigid bubble pit formation and huge signal enhancement in super-resolution near-field structure disk with platinum-oxide layer," *Applied Physics Letters*, 2002, vol. 81, No. 25, pp. 4697-4699.

(Continued)

*Primary Examiner*—Ali Neyzari
(74) *Attorney, Agent, or Firm*—Oliff & Berridge, PLC

(57) ABSTRACT

An optical recording medium includes a substrate, a first dielectric layer, a recording layer, a second dielectric layer, a super-resolution layer, and a third dielectric layer, which are provided in that order. The super-resolution layer is formed of a material configured such that voids are generated when the material is irradiated with DC light at a predetermined irradiation power for 1 to 300 seconds. Therefore, super-resolution reproduction can be made such that the irradiation power of a readout laser beam does not depend on the size of a recording mark.

16 Claims, 7 Drawing Sheets

U.S. PATENT DOCUMENTS

| | | |
|---|---|---|
| 6,961,300 B2 | 11/2005 | Cheong et al. |
| 7,440,370 B2 * | 10/2008 | Kuwahara et al. ........ 369/47.53 |
| 7,457,215 B2 * | 11/2008 | Kuwahara et al. ........ 369/47.53 |
| 2005/0117478 A1 | 6/2005 | Kuwahara et al. |

FOREIGN PATENT DOCUMENTS

| | | |
|---|---|---|
| JP | A 2003-006872 | 1/2003 |
| JP | A 2004-039177 | 2/2004 |
| JP | A 2004-087073 | 3/2004 |
| JP | A 2004-220687 | 8/2004 |
| KR | 2003-2590 | 1/2003 |
| KR | 2005-54657 | 6/2005 |

OTHER PUBLICATIONS

Supplementary European Search Report issued in European Patent Application No. 06 78 2464 on Oct. 13, 2009.

Kuwahara et al., "Thermal origin of readout mechanism on super resolution near-field structure disk," Technical Report of IEICE, Mar. 2004, pp. 19-24.

* cited by examiner

OPTICAL RECORDING MEDIUM AND METHOD FOR REPRODUCING INFORMATION FROM OPTICAL RECORDING MEDIUM

TECHNICAL FIELD

The present invention relates to an optical recording medium from which information can be reproduced by irradiating recording marks formed in a recording layer with a readout beam. In particular, the invention relates to an optical recording medium from which small recording marks having a size equal to or smaller than the resolution limit of a reproducing optical system can be reproduced and to a method for reproducing information from the optical recording medium.

BACKGROUND ART

In recent years, super-resolution optical recording media have been proposed from which a train of recording marks smaller than the diffraction limit of a reproducing optical system can be reproduced, as disclosed in, for example, Japanese Patent Application Laid-Open No. 2003-6872.

Small recording marks (super-resolution recording marks) smaller than the resolution limit of a reproducing optical system can be reproduced from such super-resolution optical recording media. However, its principle is still unclear.

Optical recording media such as CDs (compact discs) and DVDs (digital versatile discs) are configured to include: a recording layer; a dielectric layer for protection of the recording layer and for reflectivity control for reading information recorded in the recording layer by using a readout laser beam; and a reflection layer, these layers being formed on a substrate.

The recording is made such that two types of areas having different reflectivities are formed in the recording layer. One is referred to as a recording mark, and the other is referred to as a blank. The recording mark can be reproduced when the size thereof in the scanning direction of a readout laser beam is greater than a resolution limit of $\lambda/4NA$, where $\lambda$ is the wavelength of the readout laser beam, and NA is the numerical aperture of an objective lens.

Generally, in a reproducing method in which light is used, a recording mark train having a period equal to or less than a certain recording mark train period cannot be read. The length of this recording mark train period is referred to as a diffraction limit. In a reproducing optical system with a wavelength of $\lambda$ and a numerical aperture of NA, the diffraction limit is given by $\lambda/NA/2$. Assuming that the lengths of the recording mark area and the blank area are the same in one period, the length of the recording mark is given by $\lambda/NA/4$. This length of the recording mark is referred to as a resolution limit.

In order to increase the recording density of the optical recording media described above, it is necessary to reduce the wavelength $\lambda$ or increase NA. However, both have their limits.

In view of the above, the super-resolution optical recording media mentioned above have been proposed. In one type of such media, a method has been proposed in which a structure for reducing the spot size of a readout laser beam is added to the optical recording media. For example, it has been contemplated to use a material that transforms into a liquid state when the temperature increases due to irradiation with a laser beam or a semiconductor material having a band gap that varies with the increase in temperature.

However, in both cases, since the size of a light spot varies depending on the power of a readout laser beam irradiated onto the optical recording medium, a problem exists in that an optimal laser power for super-resolution reproduction must be determined for each recording mark size.

DISCLOSURE OF THE INVENTION

It is an object to be solved by this invention to eliminate the dependence of the irradiation power of a laser beam for super-resolution reproduction on the size of a recording mark in an optical recording medium.

The present inventor has made intensive studies and consequently found that the dependence of the irradiation power of a readout laser beam on the size of a recording mark can be eliminated by providing, in the vicinity of a recording layer, a super-resolution layer formed of a material in which voids are generated when the material is irradiated with DC light at a predetermined irradiation power for 1 to 300 seconds.

In summary, the above-described objectives are achieved by the following embodiments of the present invention.

(1) An optical recording medium, comprising a substrate and at least a recording layer and a super-resolution layer each formed on the substrate, wherein the super-resolution layer is formed of a material configured such that voids are generated by irradiating the material with DC light at a predetermined irradiation power for 1 to 300 seconds.

Here, the word "DC light" means a light irradiating the optical recording medium without modulation of the irradiation power in a frequency lower than at least the highest frequency train of signal train which is recorded on the recording medium.

(2) An optical recording medium, comprising a substrate and at least a recording layer and a super-resolution layer each formed on the substrate, wherein the super-resolution layer is formed of a material having a predetermined irradiation power at which a void is generated by irradiating the material with DC light for 1 to 300 seconds.

(3) The optical recording medium according to (1) or (2), wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed from an irradiation power less than the predetermined power at which the void is generated to an irradiation power greater than the predetermined power.

(4) The optical recording medium according to (1) or (2), wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed, the material having the predetermined irradiation power at which the void is generated within the range of change in irradiation power.

(5) The optical recording medium according to any one of (1) to (4), wherein the super-resolution layer is formed of a compound of any of Sb, Bi, Te, Zn, Sn, Ge, and Si.

(6) The optical recording medium according to (5), wherein the material contains at least one of Ag and In.

(7) A method for reproducing information from an optical recording medium, the method being characterized in that information of a recording mark is reproduced by irradiating an optical recording medium with reproducing light, the optical recording medium including a substrate and at least a recording layer and a super-resolution layer each formed on the substrate, the super-resolution layer being formed of a material configured such that a void is generated by irradiating the material with the reproducing light at a predetermined irradiation power for 1 to 300 seconds, the recording layer having the recording mark formed therein, the recording mark having a size equal to or less than a resolution limit of a reproducing optical system used for reproduction, the optical recording medium being irradiated with the reproducing light at an irradiation power greater than an irradiation power at which the void is generated.

(8) A method for reproducing information from an optical recording medium, the method being characterized in that information of a recording mark is reproduced by irradiating an optical recording medium with reproducing light, the optical recording medium including a substrate and at least a recording layer and a super-resolution layer each formed on the substrate, the super-resolution layer being formed of a material which has a predetermined irradiation power at which a void is generated by irradiating the material with DC light for 1 to 300 seconds, the recording layer having the recording mark formed therein, the recording mark having a size equal to or less than a resolution limit of a reproducing optical system used for reproduction, the optical recording medium being irradiated with the reproducing light at an irradiation power greater than an irradiation power at which the void is generated.

(9) A method for reproducing information from an optical recording medium, the method being characterized in that a DC light irradiation power at which a void is generated is used as a reproducing power for an optical recording medium, the optical recording medium including a substrate and at least a recording layer and a super-resolution layer each formed on the substrate, the super-resolution layer being formed of a material which has a predetermined irradiation power at which the void is generated by irradiating the material with DC light for 1 to 300 seconds, the recording layer having a recording mark formed therein, the recording mark having a size equal to or less than a resolution limit of a reproducing optical system used for reproduction.

BEST MODE FOR CARRYING OUT THE INVENTION

Figure 1:
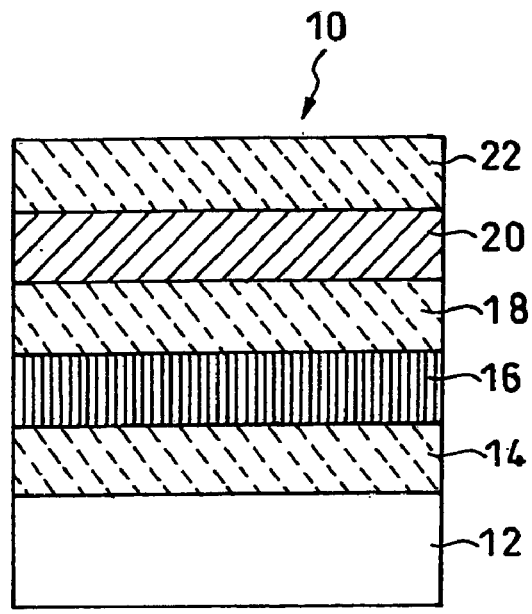
FIG. 1 is an enlarged cross-sectional view schematically illustrating a main area of an optical recording medium according to Example 1 of the present invention.

In the best mode, an optical recording medium includes a first dielectric layer, a recording layer, a second dielectric layer, and a super-resolution layer which are formed on a substrate in that order. The super resolution layer is formed of a material containing Ag, In, Sb, or Te. This material is designed such that voids are generated by the irradiation of DC light of a reproduction wavelength at a predetermined irradiation power for 1 to 300 seconds or such that the material has a predetermined irradiation power at which voids are generated by the irradiation of DC light of a reproduction wavelength for 1 to 300 seconds.

As used herein, the time period of "1 to 300 seconds" does not, of course, mean a critical time period but refers to an irradiation time period which may be sufficient for void generation. This irradiation time period is derived from the results obtained by observing various void generation conditions in consideration that a suitable irradiation time period differs depending on the compositions of the components of a medium. Specifically, the voids may be generated after a short irradiation time period, e.g., immediately after the irradiation is started or after a long irradiation time period, e.g., after the irradiation is continued for a long period of time. Note that voids are not always generated at all irradiation powers in the above irradiation time period. Therefore, after observations are made at different irradiation powers, the "predetermined irradiation power" is defined as an irradiation power at which the generation of voids is confirmed.

As used herein, the voids are a structure generated in the super-resolution layer when this layer is irradiated with a reproducing light beam at the predetermined irradiation power for a certain period of time. Specifically, the voids are a structure that, when a cross-section of a super-resolution layer containing the voids is observed under, for example, a transmission electron microscope, appears as a contrasted white area. Furthermore, this structure does not substantially exhibit any intensity peaks in elementary analysis by means of an energy dispersive X-ray spectrometer (Energy Dispersive X-ray Spectroscopy: EDS) attached to the transmission electron microscope. Moreover, in a transmission image under, for example, an optical microscope, the voids also appear as a contrasted white area. In addition, in an optical disc evaluation apparatus, the voids can be observed as spike-like noise appearing on an oscilloscope. The voids are generated by the irradiation of a readout beam at the predetermined irradiation power irrespective of whether the irradiated area is a recorded area or a non-recorded area. The voids have characteristics that, once generated, they do not disappear by applying the readout beam at a power lower than the predetermined irradiation power but disappear by applying the readout beam at a power higher than the predetermined irradiation power. In the present application, if any one of the above three situations is met, the voids are considered to be generated.

Example 1

As shown in FIG. 1, an optical recording medium 10 according to Example 1 of the present invention is configured to include a first dielectric layer 14, a recording layer 16, a second dielectric layer 18, a super-resolution layer 20, and a third dielectric layer 22, which are deposited on a substrate 12 in that order.

The substrate 12 is formed of, for example, polycarbonate. Furthermore, the first dielectric layer 14, the second dielectric layer 18, and the third dielectric layer 22 are formed of an oxide, a sulfide, or the like of a semiconductor or a metal, such as $ZnS$—$SiO_2$, $ZnS$, or $ZnO$.

The recording layer 16 is formed of a material such as PtOx which changes its optical constant when thermally decomposed into platinum and oxygen, but the material is not limited to PtOx. Any material may be used so long as it changes its optical constant when irradiated with a recording laser beam and so long as recording marks formed in the recording layer 16 do not disappear when irradiated with a readout laser beam at an irradiation power higher than an irradiation power that allows voids (described later) to be generated in the super-resolution layer 20.

The super-resolution layer 20 is formed of a material in which the voids are generated by the irradiation of a readout beam at the predetermined irradiation power for 1 to 300 seconds. Specifically, the super-resolution layer 20 is formed of one material from among elements including Sb, Bi, and Te and compounds of Sb, Bi, Te, Zn, Sn, Ge, and Si, such as Sb—Zn, Te—Ge, Sb—Te, Sb—Bi, Bi—Te, and Sb—Bi—Te each of which contains any of the above elements.

The predetermined irradiation power and the irradiation time period of the readout beam are determined by actually irradiating each material with the readout beam and confirming the generation of the voids. The generation of the voids is confirmed by means of observation under a transmission electron microscope, observation under an optical microscope, EDS analysis, or an optical disc evaluation apparatus with an oscilloscope. These are described later. The use of the transmission electron microscope provides a higher resolution than those in the other cases, so that the voids can be confirmed even when the irradiation is performed with the readout beam for a shorter period of time.

Any other material may be used so long as it is opaque to the wavelength of the readout laser beam and has low thermal conductivity.

In addition, a material which is one of the above materials further containing at least one of Ag and In may be used as the material for the super-resolution layer 20.

In practice, the optical recording medium 10 was configured as follows. The first, second, and third dielectric layers 14, 18, and 22 formed on the substrate 12 were formed of $(ZnS)_{85}(SiO_2)_{15}$ and to have thicknesses of 140 nm, 40 nm, and 100 nm, respectively. The recording layer 16 was formed of PtOx and to have a thickness of 4 nm, and the super-resolution layer 20 was formed of $Ag_6In_{4.4}Sb_{61}Te_{28.6}$ and to have a thickness of 60 nm.

This optical recording medium 10 was irradiated with a readout laser beam at an irradiation power of 4.0 mW and a linear velocity of 6 m/s for 60 seconds using an optical disk evaluation apparatus (DDU-1000, product of Pulstec Industrial Co., Ltd.) including a reproducing optical system with a laser wavelength of 635 nm and a numerical aperture NA of 0.60. Thereafter, a cross-section of the medium was observed under a transmission electron microscope.

Figure 2:
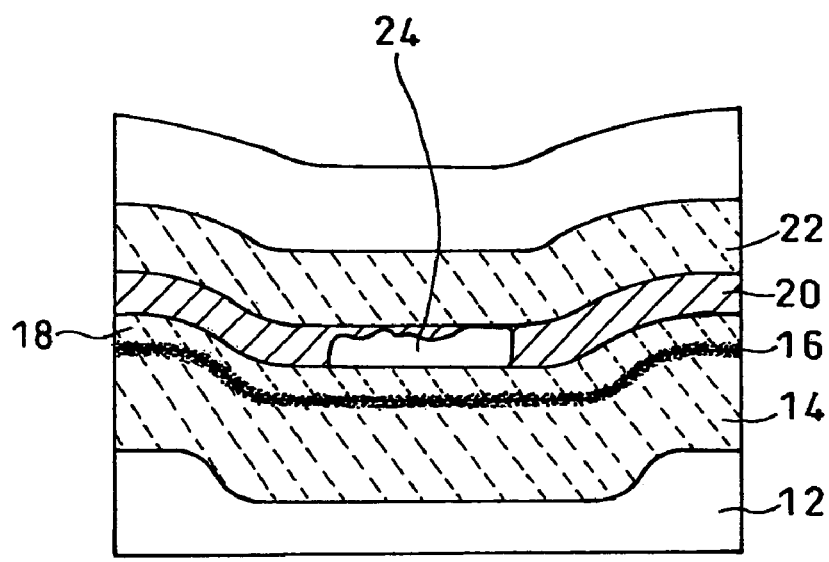
FIG. 2 is a cross-sectional transmission electron microscope image showing a state in which voids are generated in the optical recording medium according to Example 1.

The observed transmission electron microscope image is illustrated in FIG. 2. It was confirmed that a void 24 appearing as a contrasted white area, or an area that does not substantially exhibit any intensity peaks in EDS elementary analysis, was formed in the super-resolution layer 20. In addition, as shown in FIG. 3, voids 24 appearing as contrasted white areas were observed in a transmitted light image of the optical recording medium under an optical microscope.

Figure 3:
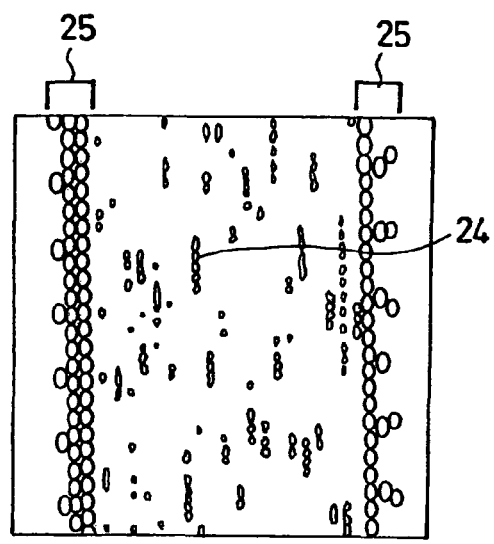
FIG. 3 is a transmitted light image of the optical recording medium taken under an optical microscope.

In FIG. 3, ellipsoidal areas (bright spots) arranged in rows are markers 25, and small white areas (bright spots) randomly arranged between the two rows of markers 25 are the voids 24.

Figure 4:
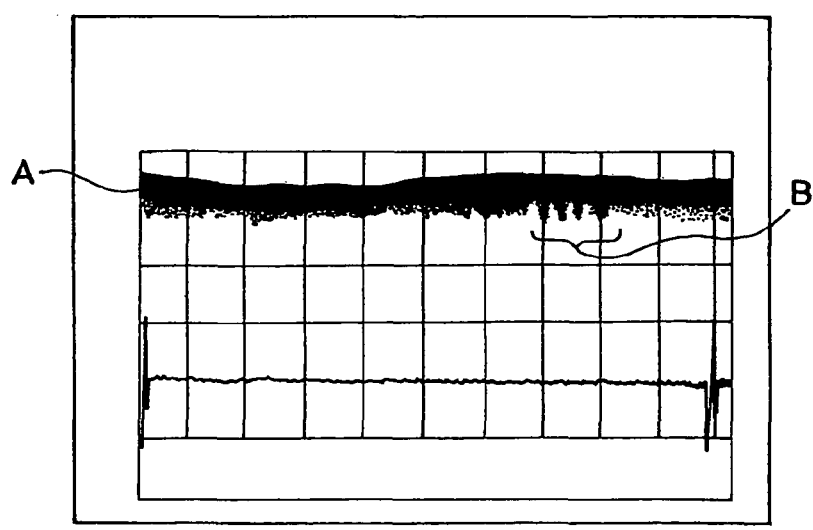
FIG. 4 is a graph showing variations in intensity of reflected light, the variations being obtained by observing the optical recording medium having voids generated therein by means of an optical disc evaluation apparatus.

Furthermore, FIG. 4 is a graph showing the intensity of reflected light observed by an oscilloscope used in the optical disc evaluation apparatus, and the width of a band-like area indicated by symbol A represents the intensity of the reflected light. As shown in FIG. 4, spike-like noise caused by the voids 24 was found to be generated in a region indicated by symbol B. In other words, areas having a reduced reflected-light intensity were observed.

The voids 24 were generated randomly in tracks irradiated with the readout laser beam at the predetermined irradiation power for the predetermined period of time. The voids were also generated when the irradiation power was reduced from a large level to the predetermined irradiation power, and this state was maintained for a certain period of time. Note that when the readout laser beam was applied at an irradiation power higher than the predetermined irradiation power from the beginning, the generation of voids was not found. In addition, the once generated voids also disappeared when irradiated with the readout laser beam at an irradiation power higher than the predetermined irradiation power for a certain period of time.

Figure 5:
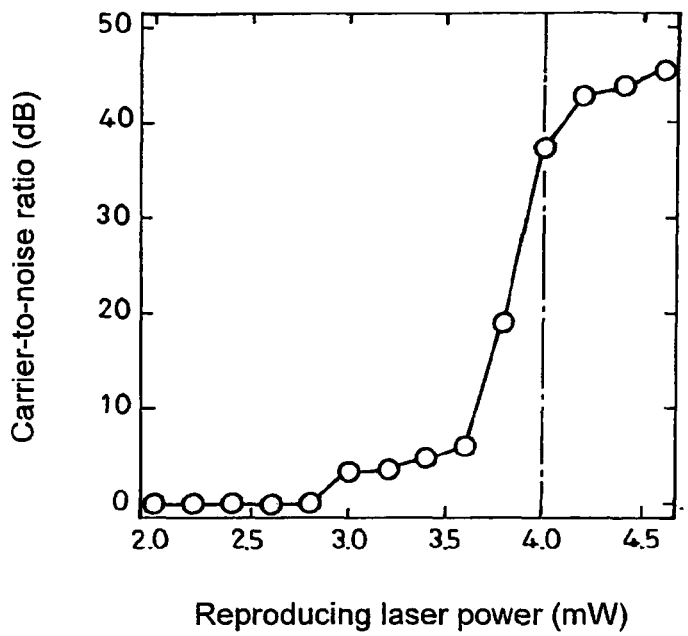
FIG. 5 is a graph showing the relationship between the irradiation power of a readout laser beam and the carrier-to-noise ratio of a reproduction signal obtained by using the readout laser beam in the optical recording medium of Example 1.

Next, recording marks having a size of 200 nm, which is equal to or less than the resolution limit of the reproducing optical system, were formed in the optical recording medium 10, and these recording marks were reproduced at irradiation powers of the readout laser beam as shown in FIG. 5.

The results show that the carrier-to-noise ratio was 8 dB when the irradiation power was 3.7 mW, but that the carrier-to-noise ratio was 45 dB when the irradiation power was 4.6 mW.

In the optical recording medium 10 of Example 1, the carrier-to-noise ratio of the observed reproduction signal was changed so as to be at least tripled over a range around a certain irradiation power, and accordingly, this can be considered as an irradiation power which allows the generation of the voids. Specifically, this irradiation power is 4.0 mW. In the optical recording medium 10 of Example 1, the voids were generated by the irradiation of a beam at an irradiation power of 4.0 mW for 60 seconds. Also, in the optical recording medium 10 of Example 1, super-resolution reproduction could be made by applying the readout beam at an irradiation power of 4.6 mW. In the present application, in order to obtain practically sufficient signal intensity, it is considered that the super-resolution reproduction can be made when the carrier-to-noise ratio is 30 dB or more.

Figure 6:
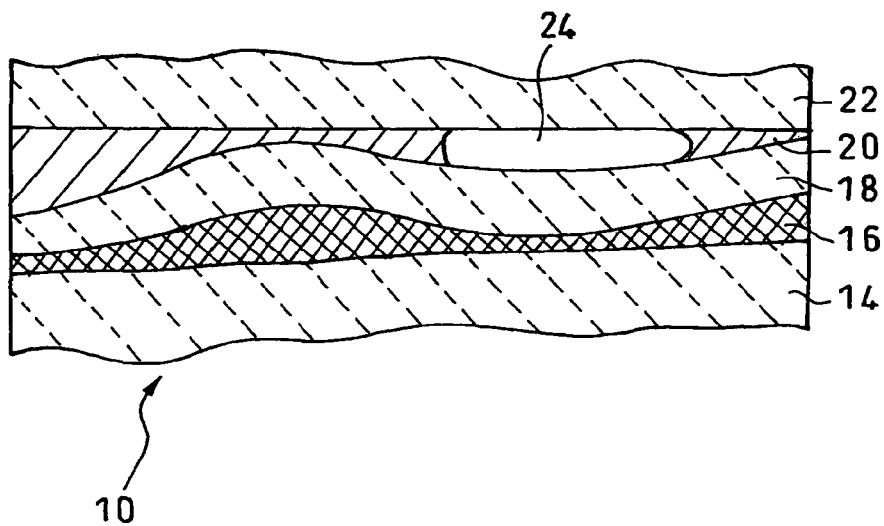
FIG. 6 is a cross-sectional transmission electron microscope image after the optical recording medium of Example 1 having super-resolution recording marks formed therein is irradiated with a readout laser beam.

After the optical recording medium 10 having recording marks of 200 nm formed therein was irradiated with the readout laser beam at a linear velocity of 6 m/s and an irradiation power of 4.0 mW for one second, the cross-section of the medium was observed under a transmission electron microscope. The results are shown in FIG. 6. As can also be seen from this figure, a void was generated in the super-resolution layer. That is, the voids are generated irrespective of whether or not the recording marks are formed in the medium.

Example 2

A description will now be given of Example 2 of the present invention.

The configuration of an optical recording medium of Example 2 was the same as that of Example 1. The materials for the first to third dielectric layers and for the recording layer were the same as those of Example 1. Example 2 is different from Example 1 in that the thickness of the super-resolution layer was 15 nm in Example 2, while the thickness was 60 nm in Example 1, and that the composition of the super-resolution layer was $Sb_2Te$ in Example 2.

Figure 7:
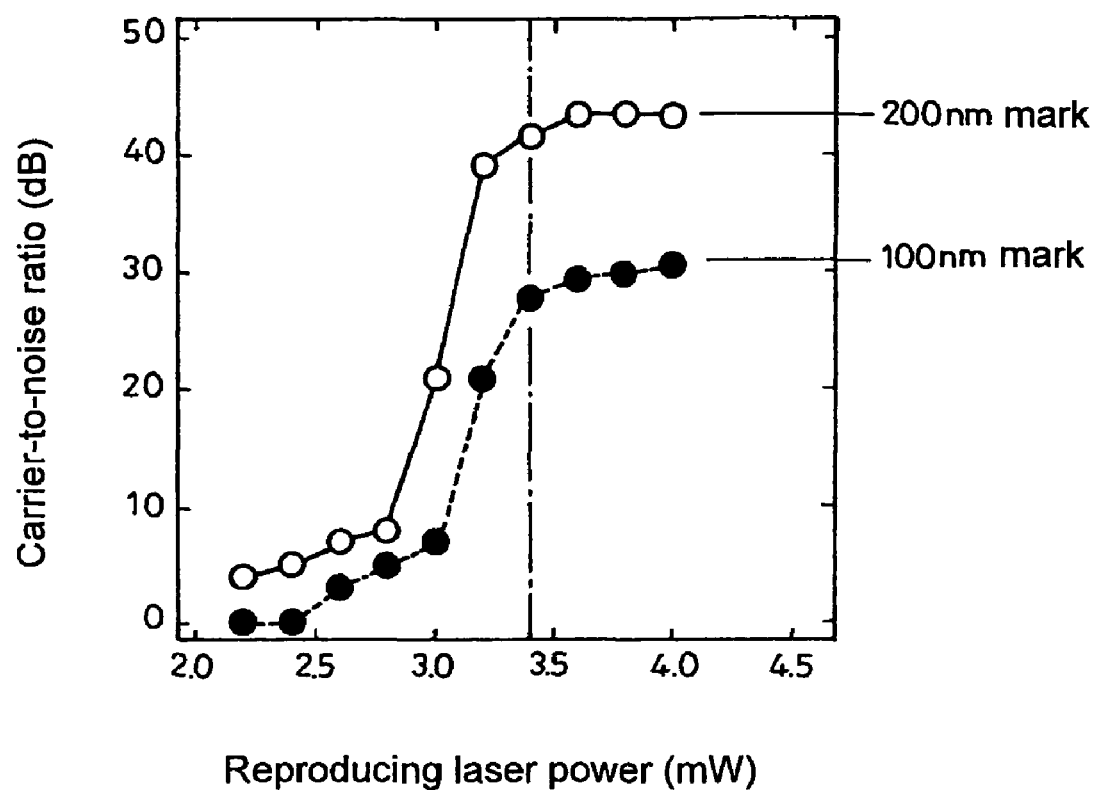
FIG. 7 is a graph similar to FIG. 5, showing the relationship between the irradiation power of a readout laser beam and a carrier-to-noise ratio in an optical recording medium of Example 2.

Recording marks of 200 nm and 100 nm, which are smaller than the resolution limit of the reproducing optical system, were formed in the optical recording medium of Example 2. The irradiation power of the readout laser beam was changed during reproduction, and the irradiation time period for each stage was set to 60 seconds so that the generation of the voids can be surely observed on an oscilloscope. Then, the voids were generated when the irradiation power was 3.4 mW. For the recording marks of both 200 nm and 100 nm, the rise of the carrier-to-noise ratio was observed at 2.8 to 3.4 mW, and stable super-resolution reproduction was possible without generation of voids when the irradiation power was higher than 3.4 mW. FIG. 7 shows the observation results for the recording marks of 200 nm.

The optical recording medium according to Example 2 was measured for variations in intensity of reflected light in a manner similar to that shown in FIG. 4 by means of the same optical disc evaluation apparatus as that in Example 1 at a linear velocity of 4 m/s. Spike-like noise was found on the oscilloscope at an irradiation power of 3.4 mW.

In the above Examples, the super-resolution layer 20 was disposed on the light incident side of the recording layer 16, but the present invention is not limited thereto. In the configuration of Examples 1 and 2, the recording layer 16 and the super-resolution layer 20 may be exchanged with each other.

Example 3

Figure 8:
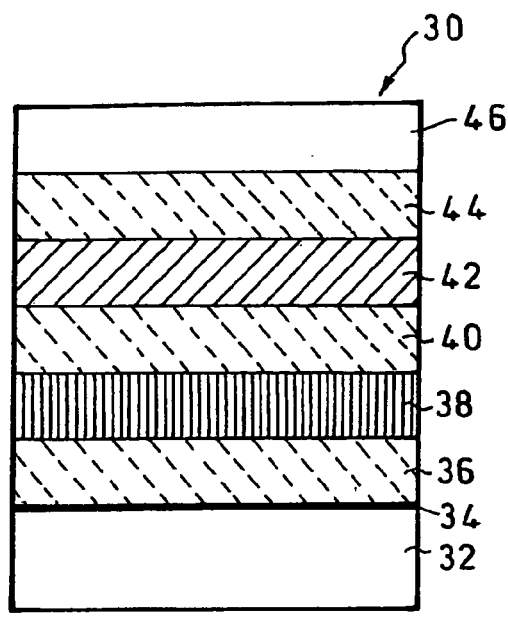
FIG. 8 is an enlarged cross-sectional view schematically illustrating a main area of an optical recording medium according to Example 3 of the present invention.

As shown in FIG. 8, an optical recording medium 30 according to Example 3 of the present invention was constructed by depositing a reflection layer 34, a third dielectric layer 36, a super-resolution layer 38, a second dielectric layer 40, a recording layer 42, and a first dielectric layer 44 on a substrate 32 of 1.1 mm in that order, applying an ultraviolet curable resin by means of spin coating, and curing the resin using ultraviolet rays to provide a light transmitting layer 46 having a thickness of 0.1 mm.

In Example 3, the same materials as those in Example 1 were used except that a Ag-1.0 mol % Pd-1.0 mol % Cu alloy having a thickness of 40 nm was used as the reflection layer 34 and that a Sb—Te alloy ($Sb_{75}Te_2$) having a thickness of 15 nm was used as the super-resolution layer 38. The thicknesses of respective dielectric layers were 20 nm for the third dielectric layer 36, 20 nm for the second dielectric layer 40, and 100 nm for the first dielectric layer 44.

This optical recording medium 30 was irradiated with a readout laser beam using the optical disk evaluation apparatus (DDU-1000, product of Pulstec Industrial Co., Ltd.) including a reproducing optical system with a laser wavelength of 405 nm and a numerical aperture NA of 0.85. The irradiation was performed while the irradiation power was changed and was continued for 60 seconds so that the generation of the voids can be surely observed on the oscilloscope. The voids were generated at 2.0 mW.

Figure 9:
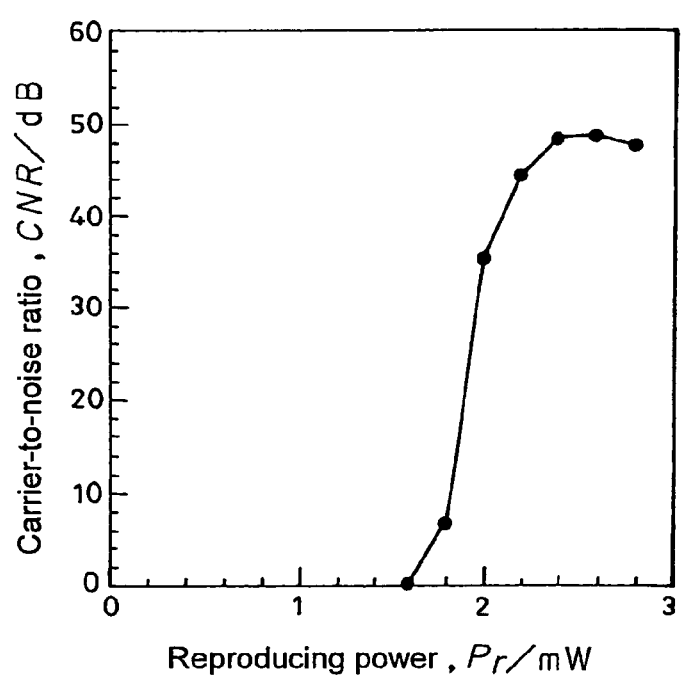
FIG. 9 is a graph showing the relationship between the irradiation power of a readout laser beam and the carrier-to-noise ratio of a reproduction signal obtained by using the readout laser beam in the optical recording medium of Example 3.

Recording marks of 75 nm, which is smaller than the resolution limit (119 nm in the present reproducing optical system), were formed in the optical recording medium 30. Then, the carrier-to-noise ratio was measured at a linear velocity of 4.9 m/s while the irradiation power of the reproducing was changed stepwise in a range around an irradiation power of 2.0 mW during reproduction. The measurement results are shown in FIG. 9. As is clear from FIG. 9, the predetermined irradiation power is 2.0 mW, and a carrier-to-noise ratio of 45 dB or higher can be obtained when the irradiation is performed at a reproducing power of 2.4 mW, which is higher than the predetermined irradiation power.

Figure 10:
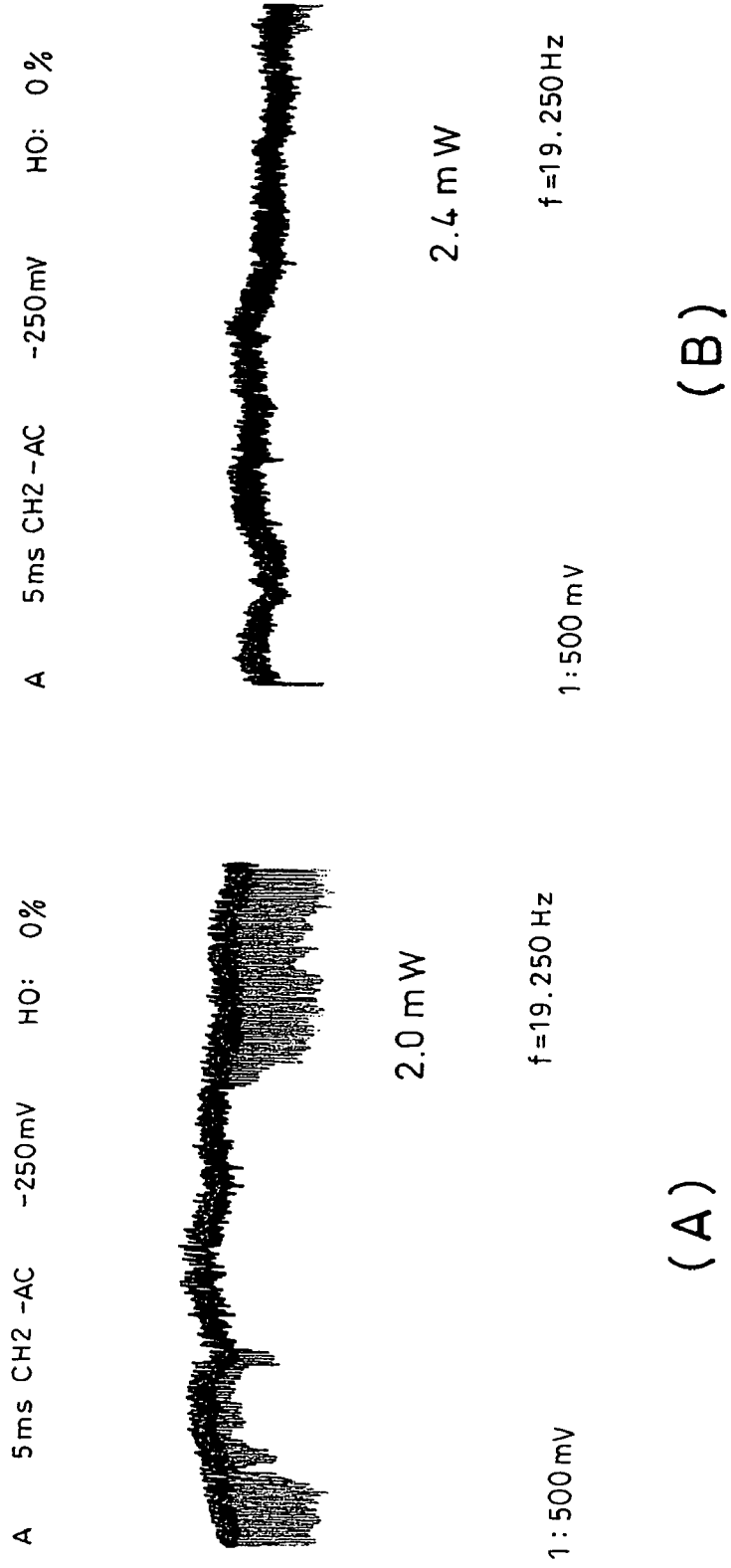
FIG. 10 is a set of graphs showing variations in intensity of reflected light, the variations being observed at different irradiation powers of a readout beam by means of an optical disc evaluation apparatus.

When the irradiation was performed with the readout laser beam at an irradiation power of 2.4 mW, which is higher than 2.0 mW, from the beginning, the generation of voids was not found. As shown in FIGS. 10(A) and 10(B), the voids were generated at an irradiation power of 2.0 mW (the generation of the voids can be confirmed by detecting the generated spike-like noise), and the spike-like noise disappeared when the irradiation was performed at a higher reproducing power (2.4 mW).

Comparative Example 1

A description will now be given of an optical recording medium (Comparative Example) in which voids are not generated.

The configuration of the optical recording medium of Comparative Example is the same as that of Example 3. The materials and thicknesses of the first to third dielectric layers, the recording layer, and the reflection layer were the same as those in Example 3. Comparative Example 1 is different from Example 3 only in that Sn having a thickness of 10 nm was used as the material for the super-resolution layer in Comparative Example 1, while $Sb_{75}Te_{25}$ having a thickness of 10 nm was used as the material for the super-resolution layer in Example 3.

Figure 11:
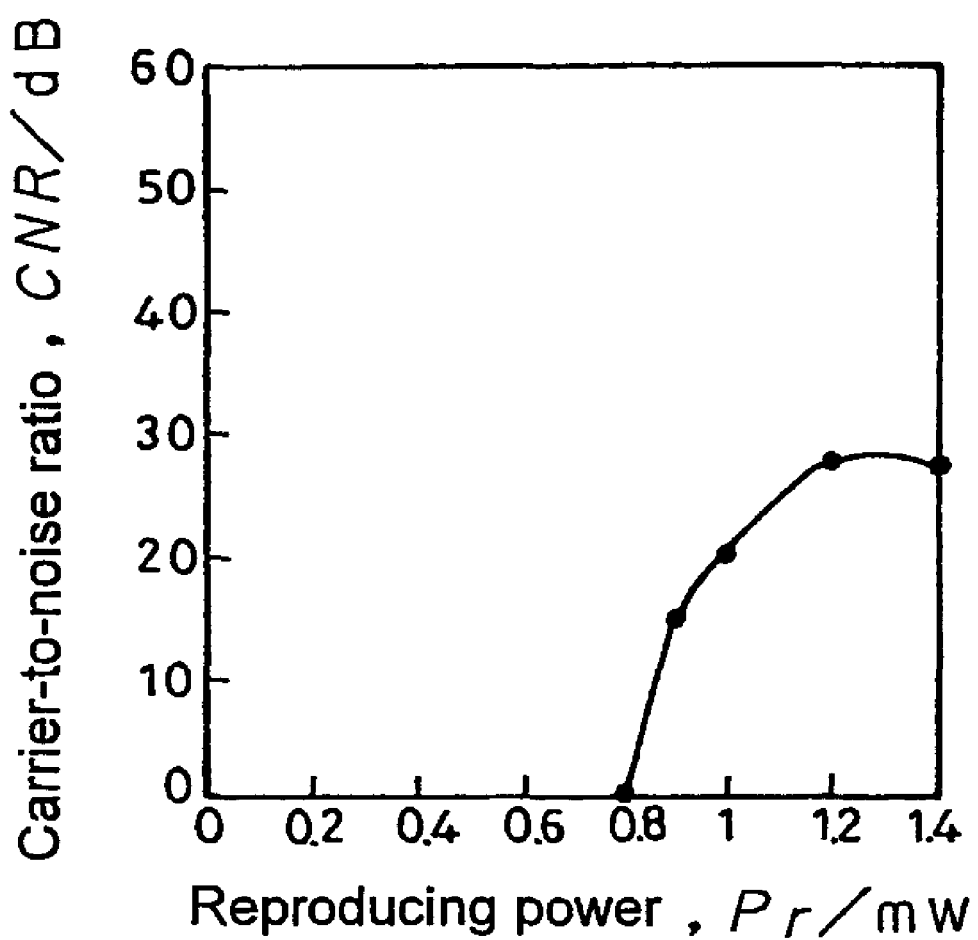
FIG. 11 is a graph similar to FIG. 9, showing the relationship between the irradiation power of a readout laser beam and a carrier-to-noise ratio in Comparative Example.

By using the optical disk evaluation apparatus (DDU-1000, product of Pulstec Industrial Co., Ltd.) including the reproducing optical system with a laser wavelength of 405 nm and a numerical aperture NA of 0.85, recording marks of 75 nm, which is smaller than the super-resolution limit (119 nm in the present reproducing optical system) were recorded in this optical recording medium. Then, the carrier-to-noise ratio was measured at a linear velocity of 4.9 m/s while the irradiation power of the readout laser beam was changed during reproduction. The measurement results are shown in FIG. 11. As can be clear from FIG. 11, the rise was observed in the range of irradiation powers of 0.9 to 1.0 mW. However, when irradiation was performed with the readout beam at a power of 1.4 mW, which is greater than that in the above range, the obtained carrier-to-noise ratio was only 27 dB. In other words, it is concluded that super-resolution reproduction cannot be made.

Moreover, when the optical recording medium of Comparative Example was irradiated at an irradiation power of 0.9 mW for a certain period of time and was subjected to measurement using an oscilloscope, spike-like noise caused by voids 24 was not observed. In other words, voids were not generated.

INDUSTRIAL APPLICABILITY

In the present invention, when an optical recording medium having super-resolution recording marks formed therein is reproduced, super-resolution reproduction can be made such that the irradiation power of a reproducing light beam does not depend on the size of the recording marks.

What is claimed is:

1. An optical recording medium, comprising:
   a substrate; and
   at least a recording layer and a super-resolution layer each formed on the substrate, wherein
   the super-resolution layer is formed of a material configured such that voids are generated by irradiating the material with DC light at a predetermined irradiation power for 1 to 300 seconds and such that the voids do not disappear by applying a readout beam at a power lower than the predetermined irradiation power, but disappear by applying the readout beam at a power higher than the predetermined irradiation power.

2. An optical recording medium, comprising:
   a substrate; and
   at least a recording layer and a super-resolution layer each formed on the substrate, wherein
   the super-resolution layer is formed of a material having a predetermined irradiation power at which a void is generated by irradiating the material with DC light for 1 to 300 seconds and having characteristics that, once generated, the void does not disappear by 1 in a readout beam at a power lower than the redetermined irradiation power but disappears by applying the readout beam at a power higher than the predetermined irradiation power.

3. The optical recording medium according to claim 1, wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed from an irradiation power less than the predetermined power at which the void is generated to an irradiation power greater than the predetermined power.

4. The optical recording medium according to claim 1, wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed, the material having the predetermined irradiation power at which the void is generated within the range of change in irradiation power.

5. The optical recording medium according to claim 1, wherein the super-resolution layer is formed of a compound of any of Sb, Bi, Te, Zn, Sn, Ge, and Si.

6. The optical recording medium according to claim 5, wherein the material contains at least one of Ag and In.

7. A method for reproducing information from an optical recording medium, the method comprising:
   reproducing information of a recording mark by irradiating an optical recording medium with reproducing light, the optical recording medium including a substrate, and at least a recording layer and a super-resolution layer each formed on the substrate, the super-resolution layer being formed of a material configured such that a void is generated by irradiating the material with the reproducing light at a predetermined irradiation power for 1 to 300 seconds and such that the void does not disappear by applying a readout beam at a power lower than the predetermined irradiation power, but disappears by applying the readout beam at a power higher than the predetermined irradiation power, the recording layer having the recording mark formed therein, the recording mark having a size equal to or less than a resolution limit of a reproducing optical system used for reproduction, the optical recording medium being irradiated with the reproducing light at an irradiation power greater than an irradiation power at which the void is generated.

8. A method for reproducing information from an optical recording medium, the method comprising:
   reproducing information of a recording mark by irradiating an optical recording medium with reproducing light, the optical recording medium including a substrate, and at least a recording layer and a super-resolution layer each formed on the substrate, the super-resolution layer being formed of a material which has a predetermined irradiation power at which a void is generated by irradiating the material with DC light for 1 to 300 seconds and having characteristics that, once generated, the void does not disappear by applying a readout beam at a power lower than the predetermined irradiation power, but disappears by applying the readout beam at a power higher than the predetermined irradiation power, the recording layer having the recording mark formed therein, the recording mark having a size equal to or less than a resolution limit of a reproducing optical system used for reproduction, the optical recording medium being irradiated with the reproducing light at an irradiation power greater than an irradiation power at which the void is generated.

9. A method for reproducing information from an optical recording medium, the method comprising:
   using a DC light irradiation power at which a void is generated as a reproducing power for an optical recording medium, the optical recording medium including a substrate, and at least a recording layer and a super-resolution layer each formed on the substrate, the super-resolution layer being formed of a material which has a predetermined irradiation power at which the void is generated by irradiating the material with DC light for 1 to 300 seconds and the void does not disappear by applying a readout beam at a power lower than the predetermined irradiation power, but disappears by applying the readout beam at a power higher than the predetermined irradiation power, the recording layer having a recording mark formed therein, the recording mark having a size equal to or less than a resolution limit of a reproducing optical system used for reproduction.

10. The optical recording medium according to claim 2, wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed from an irradiation power less than the predetermined power at which the void is generated to an irradiation power greater than the predetermined power.

11. The optical recording medium according to claim 2, wherein the super-resolution layer is formed of a material in which, when the recording layer in which a single-frequency recording mark having a size equal to or less than a resolution limit of a reproducing optical system used for reproduction is formed therein is irradiated with the DC light, a carrier-to-noise ratio, in decibel, of a reproduction signal is at least tripled when the irradiation power of the DC light is changed, the material having the predetermined irradiation power at which the void is generated within the range of change in irradiation power.

12. The optical recording medium according to claim 2, wherein the super-resolution layer is formed of a compound of any of Sb, Bi, Te, Zn, Sn, Ge, and Si.

13. The optical recording medium according to claim 3, wherein the super-resolution layer is formed of a compound of any of Sb, Bi, Te, Zn, Sn, Ge, and Si.

14. The optical recording medium according to claim 4, wherein the super-resolution layer is formed of a compound of any of Sb, Bi, Te, Zn, Sn, Ge, and Si.

15. The method according to claim 7, wherein the material contains at least one of Ag and In.

16. The method according to claim 8, wherein the material contains at least one of Ag and In.

* * * * *